United States Patent
Dukkipati et al.

(10) Patent No.: US 10,623,330 B2
(45) Date of Patent: Apr. 14, 2020

(54) DISTRIBUTED BANDWIDTH ALLOCATION AND THROTTLING

(71) Applicant: Google LLC, Mountain View, CA (US)

(72) Inventors: Nandita Dukkipati, Menlo Park, CA (US); Vinh The Lam, Milpitas, CA (US); Kirill Mendelev, Sunnyvale, CA (US); Li Shi, San Mateo, CA (US)

(73) Assignee: Google LLC, Mountain View, CA (US)

( * ) Notice: Subject to any disclaimer, the term of this patent is extended or adjusted under 35 U.S.C. 154(b) by 253 days.

(21) Appl. No.: 15/686,318

(22) Filed: Aug. 25, 2017

(65) Prior Publication Data

US 2018/0091436 A1    Mar. 29, 2018

Related U.S. Application Data

(60) Provisional application No. 62/398,947, filed on Sep. 23, 2016.

(51) Int. Cl.
*H04L 12/911* (2013.01)
*H04L 12/815* (2013.01)
(Continued)

(52) U.S. Cl.
CPC ........ *H04L 47/783* (2013.01); *H04L 12/1407* (2013.01); *H04L 43/0876* (2013.01);
(Continued)

(58) Field of Classification Search
USPC ........................................................ 709/226
See application file for complete search history.

(56) References Cited

U.S. PATENT DOCUMENTS 6,324,184 B1    11/2001  Hou et al.
7,072,295 B1    7/2006   Benson et al.
(Continued)

FOREIGN PATENT DOCUMENTS

CN    105827523 A    8/2016
EP    0847220        6/1998
(Continued)

OTHER PUBLICATIONS

Singapore Search Report and Written Opinion issued in Singaporean Application No. 10201707703R, dated Jul. 17, 2018, 11 pages.
(Continued)

*Primary Examiner* — Hermon Asres
(74) *Attorney, Agent, or Firm* — Fish & Richardson P.C.

(57) ABSTRACT

A distributed bandwidth allocation system a distributed bandwidth limiter, a first throttler, and a second throttler. The distributed bandwidth limiter receives first usage data for a first entity and usage data for a second entity. Based on the first usage data, second usage data, and a total bandwidth allocation, the distributed bandwidth limiter determines a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation. The first bandwidth allocation and the second bandwidth allocation are provided to respective throttlers than manage traffic for the first and second entities.

12 Claims, 5 Drawing Sheets

(51) Int. Cl.

| | |
|---|---|
| *H04L 12/823* | (2013.01) |
| *H04L 12/14* | (2006.01) |
| *H04M 15/00* | (2006.01) |
| *H04L 12/813* | (2013.01) |
| *H04L 12/26* | (2006.01) |
| *H04L 12/825* | (2013.01) |
| *H04L 29/08* | (2006.01) |
| *H04L 12/801* | (2013.01) |

(52) U.S. Cl.
CPC .............. *H04L 47/20* (2013.01); *H04L 47/22* (2013.01); *H04L 47/25* (2013.01); *H04L 47/32* (2013.01); *H04M 15/66* (2013.01); *H04M 15/8027* (2013.01); *H04L 47/15* (2013.01); *H04L 47/745* (2013.01); *H04L 47/822* (2013.01); *H04L 67/1097* (2013.01)

(56) References Cited

U.S. PATENT DOCUMENTS

| | | | |
|---|---|---|---|
| 7,805,516 | B2 | 9/2010 | Kettler et al. |
| 8,234,400 | B2 | 7/2012 | Bansal et al. |
| 8,547,840 | B1 | 10/2013 | Kumar et al. |
| 8,650,299 | B1 | 2/2014 | Huang et al. |
| 8,804,523 | B2 | 8/2014 | Kim et al. |
| 9,292,466 | B1 | 3/2016 | Vincent |
| 9,306,870 | B1 | 4/2016 | Klein et al. |
| 9,391,921 | B1 | 7/2016 | Riddle |
| 2001/0038640 | A1 | 11/2001 | McKinnon et al. |
| 2003/0123482 | A1* | 7/2003 | Kim ............... H04J 3/1694 370/468 |
| 2006/0233108 | A1* | 10/2006 | Krishnan ............... H04J 3/1682 370/235 |
| 2008/0130495 | A1 | 6/2008 | Does Remedios et al. |
| 2008/0294780 | A1 | 11/2008 | Lanahan et al. |
| 2009/0034460 | A1 | 2/2009 | Moratt et al. |
| 2010/0322071 | A1 | 12/2010 | Avdanin et al. |
| 2011/0066752 | A1* | 3/2011 | Lippincott ........... H04L 43/0894 709/233 |
| 2012/0195209 | A1 | 8/2012 | Jain |
| 2013/0007254 | A1 | 1/2013 | Fries |
| 2014/0244866 | A1* | 8/2014 | Manula ................ G06F 13/28 710/27 |
| 2015/0124596 | A1 | 5/2015 | Liu et al. |
| 2015/0127789 | A1 | 5/2015 | Lissack |
| 2015/0172207 | A1 | 6/2015 | Bellizia et al. |
| 2016/0080206 | A1 | 3/2016 | Prakash et al. |

FOREIGN PATENT DOCUMENTS

| | | |
|---|---|---|
| EP | 1289205 | 3/2003 |
| EP | 0888679 | 2/2004 |
| WO | WO2014021839 | 2/2014 |

OTHER PUBLICATIONS

'en.wikipedia.org' [online] "Hypervisor," Last Update: Aug. 13, 2017 [retrieved on Aug. 24, 2017] Retrieved from Internet: URL< https://en.wikipedia.org/w/index.php?title=Hypervisor&action=history> 7 pages.

'en.wikipedia.org' [online] "Token bucket," Last Update: Aug. 23, 2017, [retrieved on Aug. 24, 2017] Retrieved from Internet: URL< https://en.wikipedia.org/w/index.php?title=Token_bucket&action=history> 4 pages.

'openvswitch.org' [online] "Production Quality, Multilayer Open Virtual Switch," 2016 [retrieved on Aug. 24, 2017] Retrieved from Internet: URL< http://openvswitch.org/> 2 pages.

Bertsekas et al. "Data Networks ($2^{nd}$ ed.): Chapter 6 Flow Control," Prentice Hall, 1992, 61 pages.

Raghavan et al. "Cloud Control with Distributed Rate Limiting," ACM Sigcomm Computer Communication Review 37.4, Oct. 1, 2007, 12 pages.

Written Opinion issued in International Application No. PCT/US2017/049366, dated Aug. 27, 2018, 13 pages.

Irish Search Report issued in Irish Application No. 2017/0197, dated May 17, 2018, 7 pages.

International Search Report and Written Opinion issued in International Application No. PCT/US2017/049366, dated Dec. 1, 2017, 20 pages.

Minerva et al. "Which way to QoS in future networks: Distributed or centralized decision logic?" GITCE Congress, Aug. 31, 2011, 6 pages.

Ren et al. "Two-level Storage QoS to Manage Performance for Multiple Tenants with Multiple Workloads," IEEE $6^{th}$ International Conference on Cloud Computing Technology and Science, Dec. 15, 2014, 7 pages.

Sargento et al. "End-to-end QoS Architecture for 4G Scenarios," 14th IST Mobile and Wireless Communications Summit, Apr. 21, 2005, 6 pages.

GB Examination Report in Great Britain Application No. GB1714631, dated Feb. 4, 2020, 2 pages.

* cited by examiner

DISTRIBUTED BANDWIDTH ALLOCATION AND THROTTLING

CLAIM OF PRIORITY

This application claims priority under 35 USC § 119(e) to U.S. Patent Application Ser. No. 62/398,947, filed on Sep. 23, 2016, the entire contents of which are hereby incorporated by reference.

BACKGROUND

Cloud computing refers to network-based computing in which collections of servers housed in data centers provide computational resources and data storage as needed to end users. Many cloud computing services allow end users to execute software applications in virtual machines or other environments within the cloud. The network bandwidth for the applications and attendant storage may vary for each end user and for each application process that is executed.

A cloud computing provider must build a relatively large physical infrastructure from which cloud computing services may be offered to end users. Because the cost of such physical infrastructure can be enormous, the provider often strives to provide efficient utilization of physical resources to reduce the cost. Accordingly, a provider will often employ various rules and frameworks for allocating physical resources, such as processing cores, storage space, etc. Likewise, the provider will employ various rules and frameworks for allocating other resources, such as bandwidth. While the employment of such rules and frameworks may result in a more efficient allocation of resources, the rules and frameworks also impose an overhead cost on the provider, e.g., resources such as cores, storage and bandwidth are consumed to implement the rules and frameworks.

SUMMARY

This specification relates to distributed bandwidth allocation and throttling.

In general, one innovative aspect of the subject matter described in this specification can be embodied in a system that includes a distributed bandwidth limiter, a first throttler, and a second throttler. The distributed bandwidth limiter receives first usage data describing a first bandwidth usage value for a first entity, and receives second usage data describing a second bandwidth usage value for a second entity. Based the first usage data, second usage data, and a total bandwidth allocation, the distributed bandwidth limiter determines a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation. The first throttler receives from the distributed bandwidth limiter the first bandwidth allocation, throttles bandwidth available for network traffic for the first entity according to the first bandwidth allocation, and reports to the distributed bandwidth limiter the first usage data. The second throttler receives from the distributed bandwidth limiter the second bandwidth allocation, throttles bandwidth available for network traffic for the second entity according to the second bandwidth allocation, and reports to the distributed bandwidth limiter the second usage data. Other embodiments of this aspect include corresponding methods and computer programs, configured to perform the actions of the methods, encoded on computer storage devices.

Particular embodiments of the subject matter described in this specification can be implemented so as to realize one or more of the following advantages. The iterative monitoring or usage rates allows the system to adjust bandwidth allocations in a dynamic manner with a relatively fast convergence time. The distributed bandwidth allocation system converges to bandwidth allocations that are unique for each particular system being managed, which allows for the distributed bandwidth allocation system to be applied to multiple systems that each have unique and emergent bandwidth requirements. The distributed bandwidth allocation system is work-conserving in that the sum of the bandwidth allocations to each managed entity in a system is equal to a total bandwidth allocation for the system, resulting in no unallocated (and thus no wasted) bandwidth. The distributed bandwidth allocation system can be set for minimum and maximum bandwidth allocation for each managed entity in the system so as to ensure that each managed entity will always have at least a minimum allocated bandwidth. The iterative allocation of bandwidth can be done at intervals that strike a balance between convergence times and system overhead usage, which facilitates scaling across very large systems. Additionally, bandwidth resources are distributed fairly in that any one entity does not starve another entity of bandwidth.

Another advantage is flexibility offered in moving around the individual throttlers, e.g., the throttlers can be placed in systems that are remote of the system in which the distributed bandwidth calculations are determined. For example, the throttlers can be in different user-space processes, operating systems, NIC firmware, or hardware. The distributed algorithm can be run be on the same physical machine or even run on a different physical machine.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
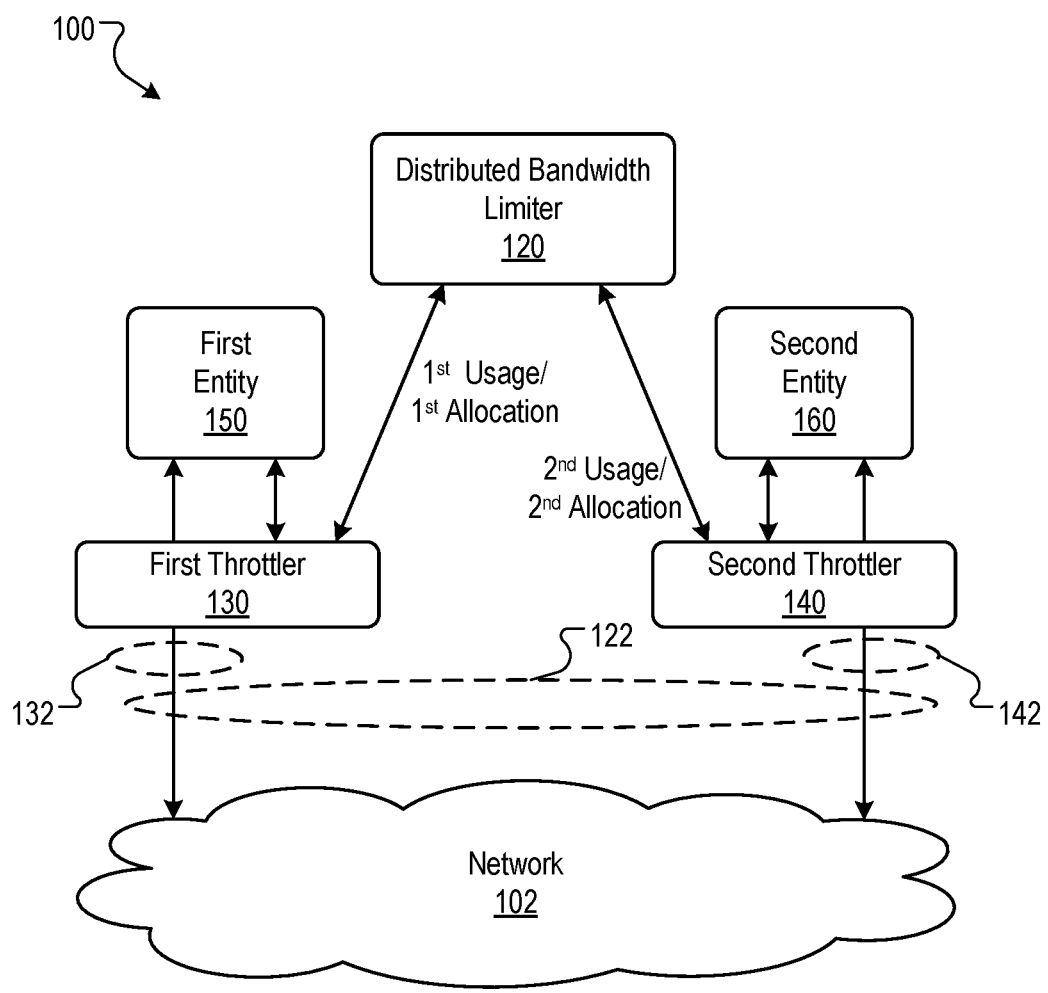
FIG. 1 is a block diagram of a distributed bandwidth allocation system.

FIG. 1 is a block diagram of a distributed bandwidth allocation system 100. The distributed bandwidth allocation system 100 manages bandwidth allocation to two or more entities, e.g., first entity 150 and second entity 160 that are subject to a total bandwidth allocation. As used in this written description, an entity is a logical and/or physical resource that consumes bandwidth in a network environment. An entity may be a physical machine, a service, or an instantiation of a process or application on one or more physical machines. Examples of entities, without limitation, include virtual machines, containers, storage systems, server devices, client devices, etc.

The total bandwidth allocation is the amount of bandwidth the first and second entities 150 and 160 may consume for network traffic over the network 102. The bandwidth may be for egress traffic, i.e., network traffic sent by the entities, or, alternatively, for ingress traffic, i.e., network traffic sent by the entities, or for a combination of egress and ingress traffic. The system 100 allocates bandwidth in a work conserving manner in that the sum of the bandwidth allocations to the entities is equal to the total bandwidth allocation.

The system 100 includes a distributed bandwidth limiter 120 and two or more throttlers, e.g., first throttler 130 and second throttler 140. Each throttler enforces a bandwidth allocation for a respective entity that it manages. Each throttler may also be implemented in a process, machine or user space this is different from the process, machine or user space in which the distributed bandwidth limiter 120 is implemented.

In the example implementation of FIG. 1, only two throttlers are included in the system 100. However, the system 100 may be implemented to manage a total bandwidth allocation for a set of N managed entities, where N>2 and where each managed entity's network traffic is subject to a bandwidth allocation for that entity.

In FIG. 1, the first throttler 130 throttles bandwidth available for network traffic for the first entity 150 according to the first bandwidth allocation. The first bandwidth allocation is depicted by the ring 132 through which network traffic is depicted as traversing. Likewise, the second throttler 140 throttles bandwidth available for network traffic for the second entity 160 according to the second bandwidth allocation depicted by the ring 142. The total bandwidth allocation is depicted by the ring 122.

In operation, the distributed bandwidth limiter 120 receives first usage data from the first throttler 130 describing a first bandwidth usage value for the first entity 150, and also receives second usage data describing a second bandwidth usage value for the second entity 160. The first and second throttlers 130 and 140 may report the usage data to the distributed bandwidth limiter 120. In some implementations, the usage data may be a value that is the amount of data sent from an entity to the network 102. In other implementations, the usage data may be a value that is the amount of data sent from an entity to the network 102 and received by the entity over the network 102.

In still other implementations, the usage data value may take into account traffic that has also been throttled by the throttler. For example, if the first entity is subject to a 500 GB/s bandwidth limit, and during a reporting period of 1 second the first entity 150 has sent 500 GB and 30 GB has been throttled, then the usage data would be 530 GB. The throttlers 130 and 140 may also have associated APIs that allow the first and second entities 150 and 160 to report bandwidth usage to the throttlers.

The distributed bandwidth limiter 120 iteratively receives the first usage data, the second usage data, and using this data and the total bandwidth allocation, determines the first bandwidth allocation and the second bandwidth allocation. The sum of the first bandwidth allocation and the second bandwidth allocation does not exceed the total bandwidth allocation. The updated first and second bandwidth allocations are then provided to the first and second throttlers 130 and 140, respectively.

More generally, for N throttlers, the distributed bandwidth limiter receives usage data from each throttler and determines N bandwidth allocations, the sum of which does not exceed the total bandwidth allocation. Each bandwidth allocation is then provided to its respective throttler.

Figure 2:
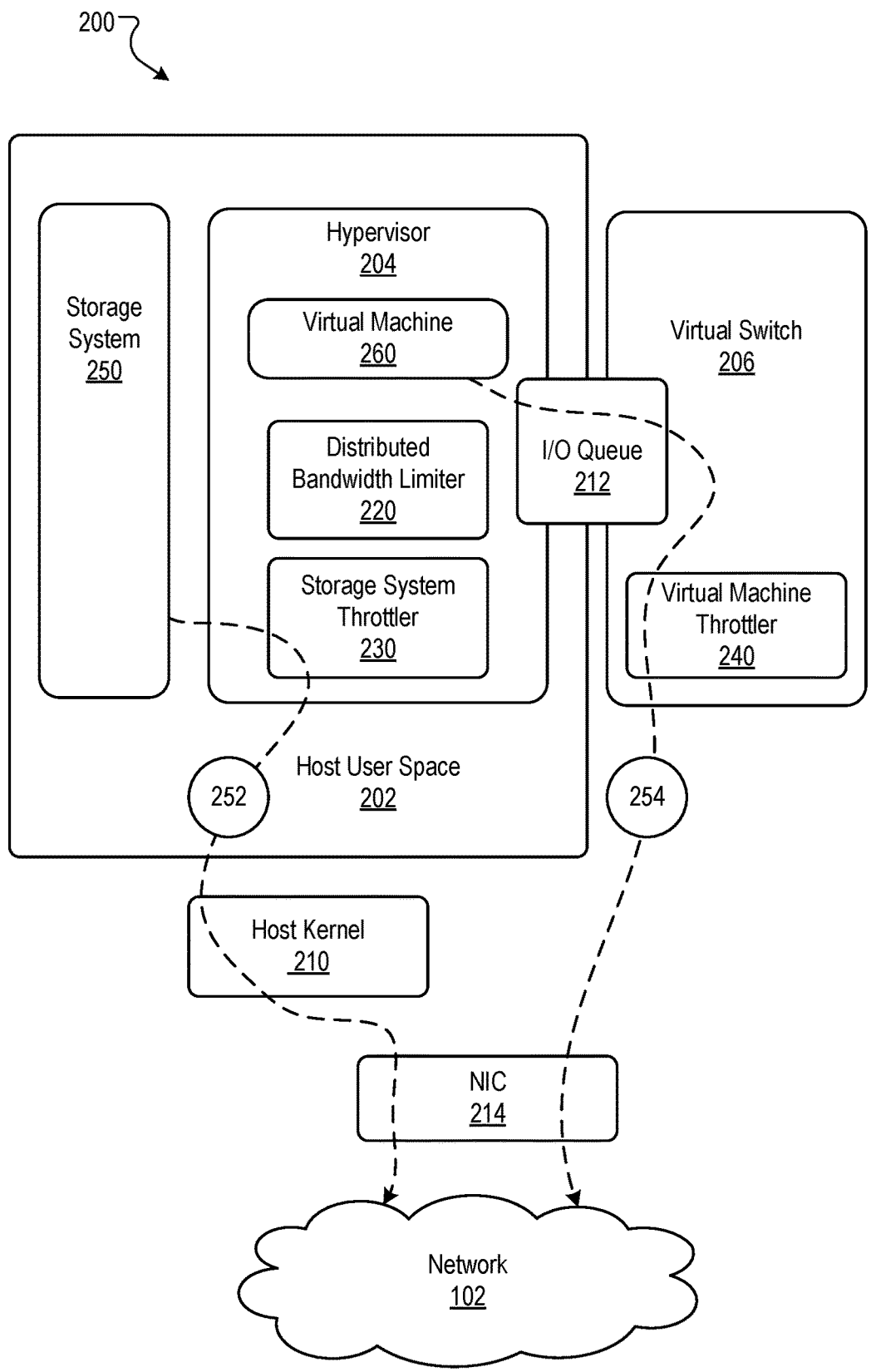
FIG. 2 is a block diagram of a distributed bandwidth allocation system implemented in a virtual machine environment.

The system 100 can be implemented in a variety of different environments. One example implementation is within a virtual machine environment 200 as depicted in FIG. 2. In FIG. 2, a host user space 202 layer is implemented above an operating system layer for one or more host machines. A hypervisor 204 monitors a virtual machine 260 and network traffic from the virtual machine 260 flows through an I/O queue 212 to a virtual switch 206. A storage system 250, which may be a virtualized storage system, is associated with the virtual machine 260 and provides data storage for the virtual machine 260, and the hypervisor 204 also manages traffic for the storage system 250. The distributed bandwidth limiter 220 and a storage system throttler 230 are instantiated in the hypervisor 204, and the virtual machine throttler 240 is implemented in the virtual switch 206.

Network traffic for the storage system 250 is depicted by the path 252, which indicates the storage system traffic is managed by the storage system throttler 230 and processed by the host kernel 210. The traffic proceeds through the NIC 214 to the external network 102. Network traffic for the virtual machine 260, depicted by the path 254, proceeds through the virtual switch 206 and is managed by the virtual machine throttler 240, and then proceeds through the NIC 214 to the external network 102.

Mapping the implementation of FIG. 2 to the system 100 of FIG. 1, the first entity 150 is the storage system 250, and the second entity 160 is the virtual machine 260. Accordingly, the first usage data is storage usage data and the first bandwidth usage value is a storage bandwidth usage value for network traffic for the storage system 250. Likewise, the second usage data is virtual machine usage data for the virtual machine 260 and the second bandwidth usage value is for network traffic for the virtual machine 260. The storage system throttler 230 manages traffic for the storage system 250 according to a storage bandwidth allocation available for network traffic for the storage system, and the virtual machine throttler 240 manages traffic for the virtual machine according to a virtual machine bandwidth allocation that specifies bandwidth available for network traffic for the virtual machine.

The total bandwidth allocation can be set according to one or more criteria. For example, the total bandwidth allocation may be the bandwidth rating of the NIC 214. Alternatively, the total bandwidth allocation may be set based on the physical resources consumed by the virtual machine, e.g., for each processing core, a total bandwidth allocation of 2 GB/s may be provided. Other appropriate criteria may be used to set or select the total bandwidth allocation.

Figure 3:
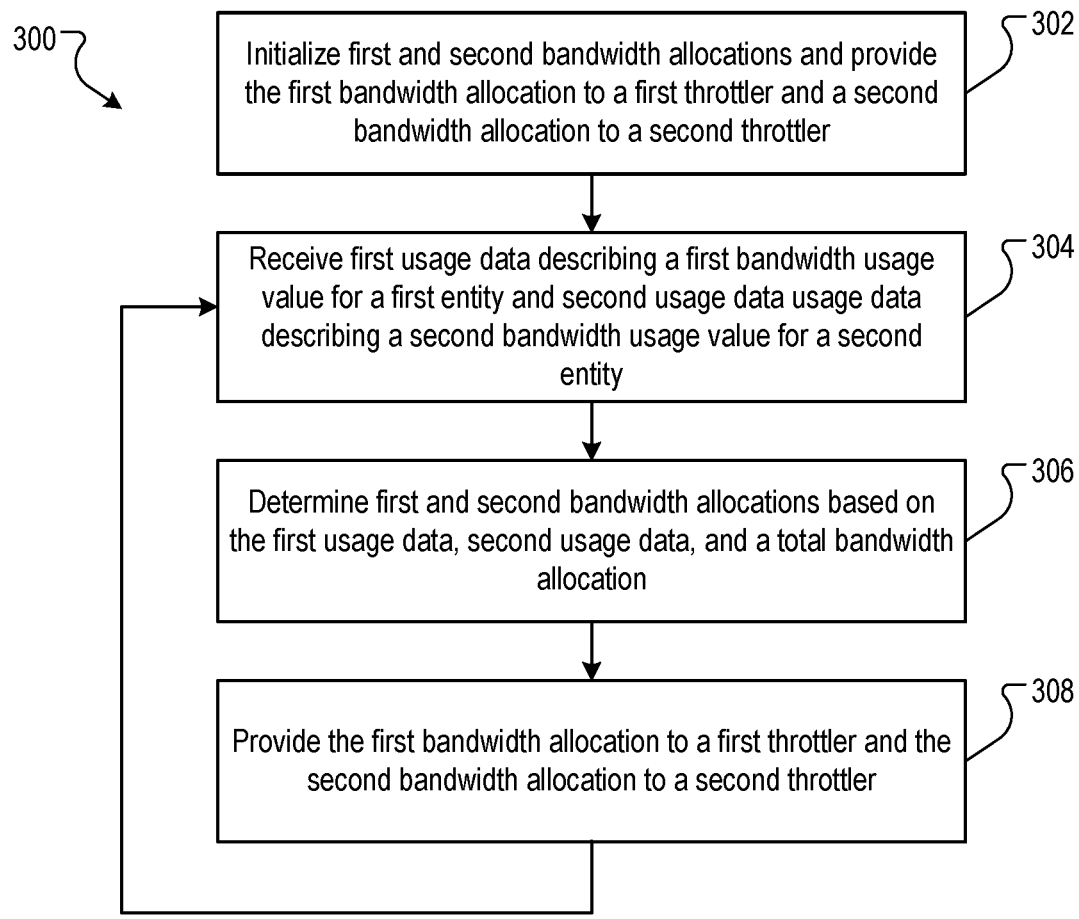
FIG. 3 is a flowchart of an example process for allocating bandwidth in a distributed manner.

FIG. 3 is a flowchart of an example process 300 for allocating bandwidth in a distributed manner. The process 300 may be implemented in the system 100, such as in the virtual machine environment 200 of FIG. 2, or in a physical system that includes one or more computers and storage devices.

The process 300 describes how the system 100 first initializes the bandwidth allocations for the managed entities, and then monitors the actual bandwidth usage of the managed entities to adjust the bandwidth allocations. More detailed descriptions of the algorithm described in FIG. 2 are provided with reference to FIGS. 4, 5A and 5B below.

The process 300 initializes the first and second bandwidth allocations and provides the first bandwidth allocation to the first throttler and the second bandwidth allocation to the second throttler (302). For example, in the case of the virtual machine environment, the storage system bandwidth allocation and the virtual machine bandwidth allocation may be initially set to respective guaranteed minimum bandwidth allocations by the distributed bandwidth limiter 220. Alternatively, the storage system bandwidth allocation and the virtual machine bandwidth allocation may be set to values for which the sum is actually less than the total bandwidth allocation. The initial values may be starting points from which an eventual convergence to steady-state bandwidth allocations is to be achieved. Other initialization values can also be used, depending on the convergence process utilized by the distributed bandwidth limiter 220.

The process 300 then begins an iterative bandwidth management process by repeating steps 304, 306 and 308. To begin, the process 300 receives first usage data describing the first bandwidth usage value for the first entity and second usage data usage data describing the second bandwidth usage value for the second entity (304). For example, after an iteration time period, the throttlers 230 and 240 report respective bandwidth usage values to the distributed bandwidth limiter 220. The time period may be selected to balance between overhead costs and convergence time. Generally, as the time period decreases in length, the overhead cost imposed by the distributed bandwidth limiter 220 increases, but the convergence time to relatively steady state bandwidth allocations decreases.

In some implementations, the time period may be dynamic, beginning at a minimum value upon initialization and increasing to a maximum value as the changes in the magnitude of the bandwidth allocations decreases. For example, the distributed bandwidth limiter 220 increase the iteration time period as the relative changes in bandwidth allocations from one iteration to the next decreases. Likewise, the distributed bandwidth limiter 220 may decrease the iteration time period as the relative changes in bandwidth allocations from one iteration to the next increases.

The process 300 determines the first and second bandwidth allocations based on the first usage data, the second usage data, and the total bandwidth allocation (306). In some implementations, the distributed bandwidth limiter 220 may store, for each entity 150 and 160, their respective usage values, and determine bandwidth demands based on the usage values. Smoothing and scaling factors may be used to aid in convergence and reduce sensitivity to noise resulting from bursts in network traffic. One example bandwidth demand algorithm is described with reference to FIG. 4 below, and an example bandwidth allocation determination algorithm is described with reference to FIGS. 5A and 5B below.

The process 300 provides the first bandwidth allocation to the first throttler and the second bandwidth allocation to the second throttler (308). The bandwidth allocations may be different from the bandwidth allocations provided for a prior iteration. The throttlers then manage network traffic for their respective entities according to the respectively received bandwidth allocations.

Figure 4:
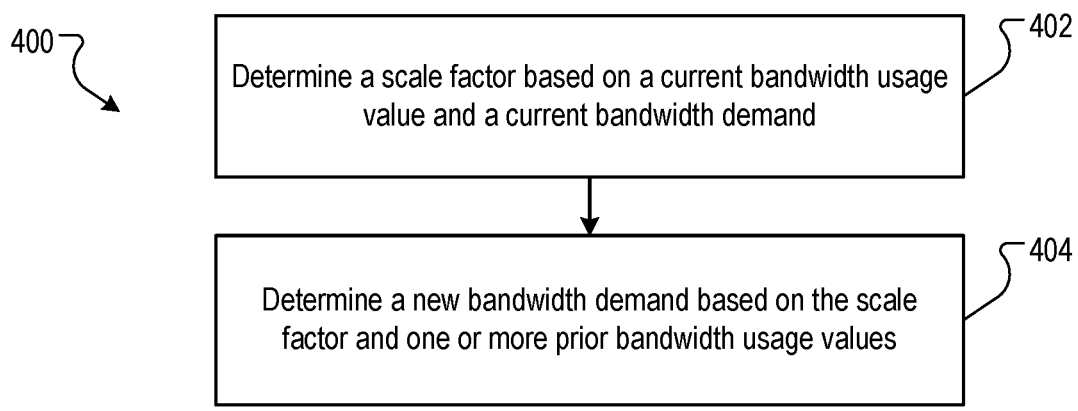
FIG. 4 is a flowchart of an example process for determining a bandwidth demand for a managed entity.

FIG. 4 is a flowchart of an example process 400 for determining a bandwidth demand for a managed entity. In some implementations, the distributed bandwidth limiter 220 performs the process 400 for each managed entity. The process 400 utilizes a scaling factor and a window of historical usage values to determine a demand for an entity.

The process 400 determines a scale factor based on the current bandwidth usage value and the current bandwidth demand (402). The scaling factor is used to scale up (or down) a final bandwidth demand calculation. In some implementations, the scaling factor may vary from a minimum value to a maximum value, and may be determined for each iteration.

In one example implementation, the scaling factor may be adjusted based on usage value and a current demand. For example, for an $i^{th}$ iteration, the following algorithm may be used:

```
If usage_value [i] >= K * demand[i-1]
    scale_factor = scale_factor + INC
    if scale_factor > Max_scale_factor
    scale_factor = Max_scale_factor
else
    scale_factor = Reset_value
``` where:
usage_value[i] is the usage value for an $i^{th}$ iteration;
demand[i−1] is a bandwidth demand for the i−1 iteration;
K is thresholding value, which is typically less than unity;
INC is an increment value;
Max_scale_factor is maximum scale factor; and
Reset_value is a value to which the scale factor may be reset.

The values of K, INC, Max_scale_factor and Reset_value may be selected based on a balancing of convergence time and sensitivity.

The process 400 determines a new bandwidth demand based on the scale factor and one or more prior bandwidth usage values (404). A variety of appropriate functions may be used to determine the bandwidth demand, and a function may be selected based on the type of entity being managed. For example, for virtual machine network traffic, the demand may be based on product of the scale factor determined for the virtual machine and a maximum of N prior usage values for the virtual machine, e.g., $$\text{Demand\_}VM[i]=\text{scale\_factor}*\max(\text{Usage\_value}[i-1] \ldots \text{Usage\_value}[i-N])$$

Other functions can also be used, e.g., such as product of the scale factor and an average of the N prior usage values. In some implementations, a non-zero floor value may also be used, e.g., 1% of the total bandwidth allocation, to ensure that the determined demand bandwidth is always greater than 0.

The value of N for determining demand can vary for each managed entity. For entities that have very bursty traffic, the value of N may be increased relative to entities that have less bursty traffic.

Other bandwidth demand calculation algorithms can also be used.

Figure 5A:
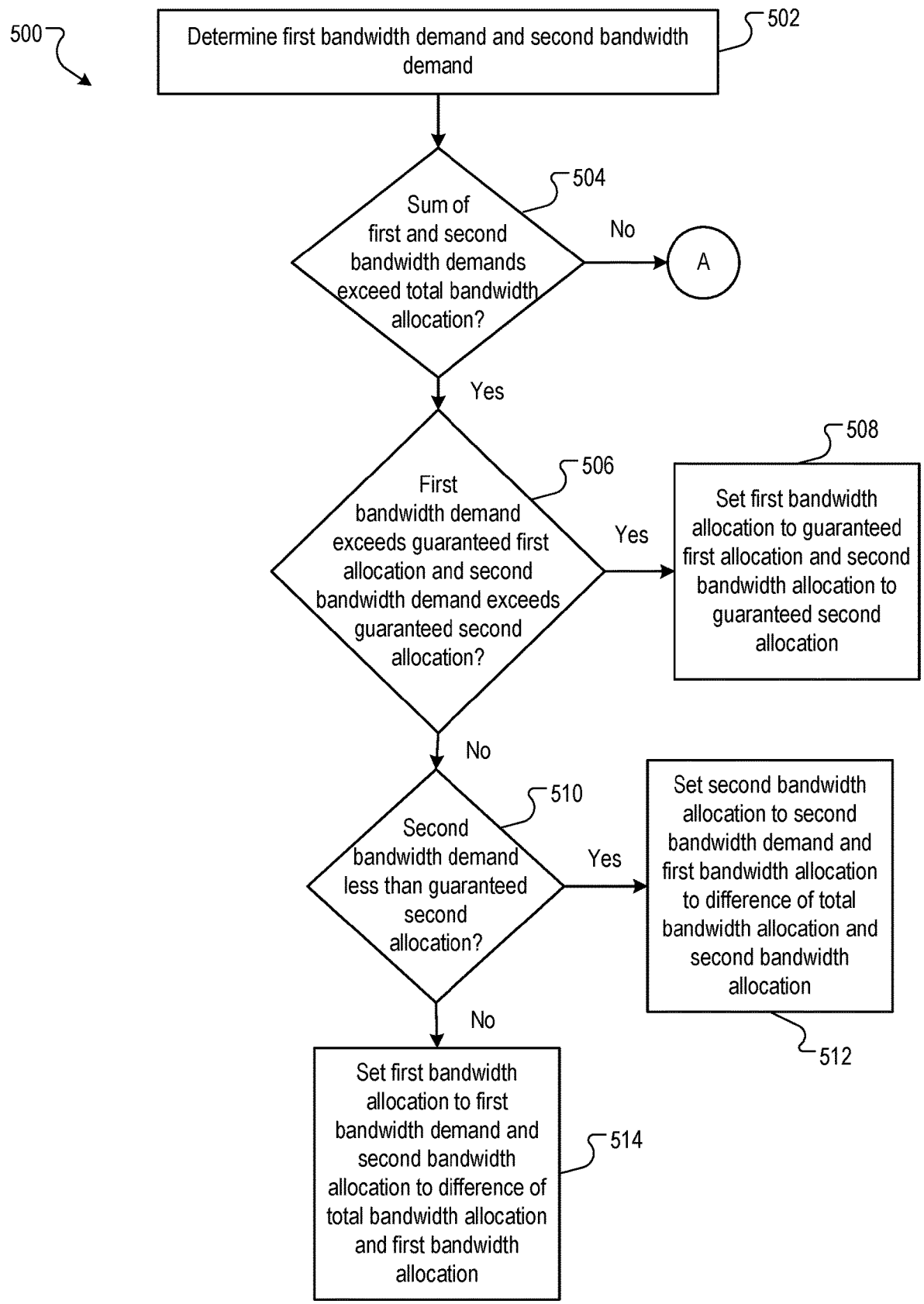
FIGS. 5A and 5B are flowcharts of an example process for allocating bandwidth in a distributed manner.
Figure 5B:
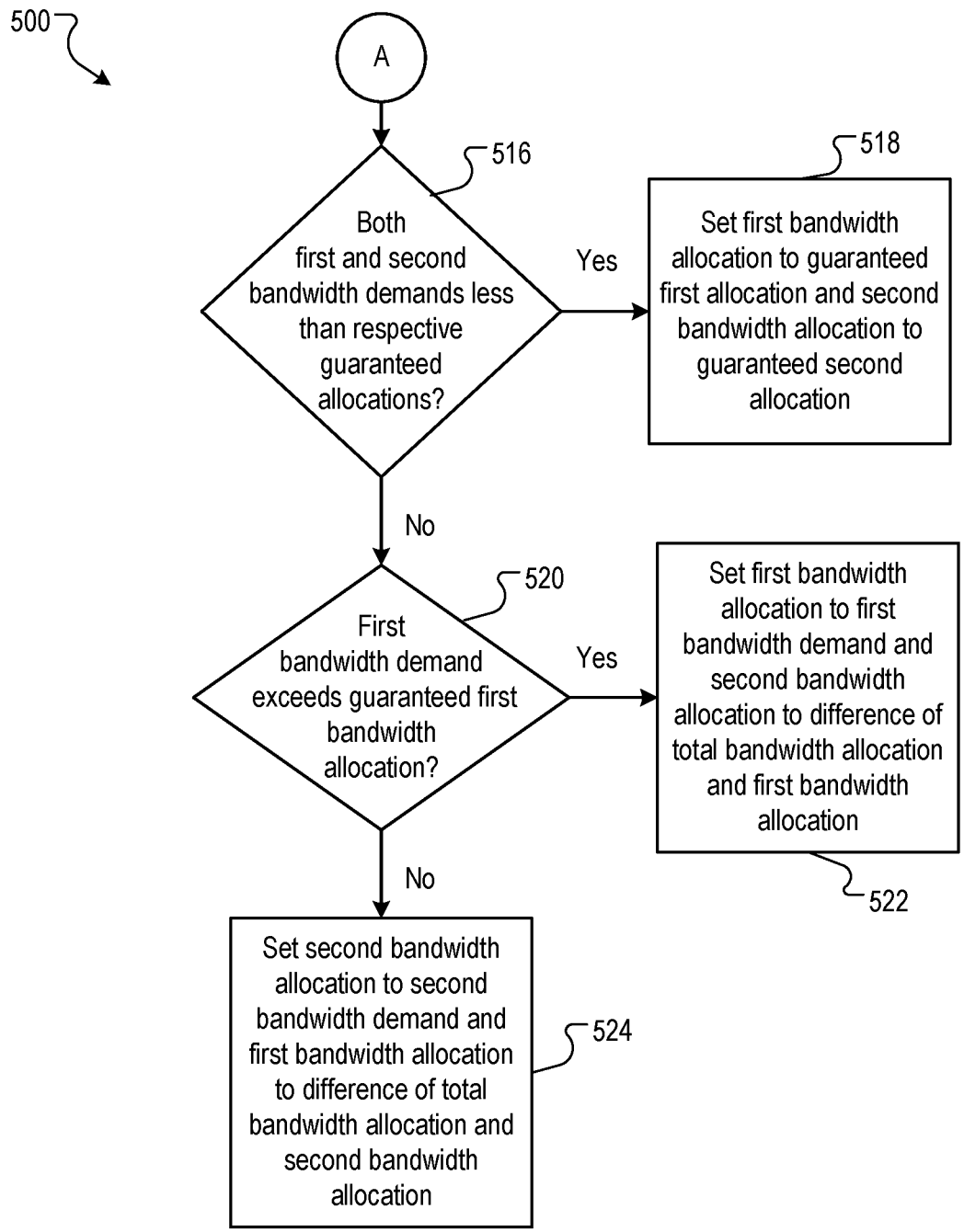

After the demand bandwidths are determined for each entity, the distributed bandwidth allocator then determine bandwidth allocations for each entity and distributes the new bandwidth allocations to the throttlers. A variety of appropriate bandwidth allocation algorithms can be used, and one example is described with reference to FIGS. 5A and 5B. In particular, FIGS. 5A and 5B are flowcharts of an example process 500 for allocating bandwidth in a distributed manner. The process 500 has two main branches—the first branch, shown in FIG. 5A, is taken when the sum of the bandwidth demands calculated for the entities is greater than the total bandwidth allocation. The second branch, shown in FIG. 5B, is taken when the sum of the bandwidth demands calculated for the entities is less than the total bandwidth allocation.

The process 500 determines the first bandwidth demand and second bandwidth demand (502). For example, the distributed bandwidth limiter 220 may use the process 400 (or some other process) for each managed entity to determine the bandwidth demand for that entity. In the example of FIG. 2, the distributed bandwidth limiter 220 determines a storage system bandwidth demand as the first bandwidth demand, and determines a virtual machine bandwidth demand as the second demand.

The process 500 determines whether a sum of the first and second bandwidth demands exceed the total bandwidth allocation (504). If the process 500 does not determine that the sum of the first and second bandwidth demands exceed the total bandwidth allocation, then the process 500 branches to the next step 516 described below with reference to FIG. 5B, and which is discussed later.

If the process 500 does determine that the sum of the first and second bandwidth demands exceed the total bandwidth allocation, then the process 500 determines whether the first bandwidth demand exceeds a guaranteed first allocation and the second bandwidth demand exceeds a guaranteed second allocation (506). Each throttler has a guaranteed allocation that is assigned as the entity bandwidth allocation when all of the respective bandwidth demands for the entities exceed their respective guaranteed allocations. Thus, if the process does determine that the first bandwidth demand exceeds the guaranteed first allocation and the second bandwidth demand exceeds the guaranteed second allocation, then the process 500 sets the first bandwidth allocation to the guaranteed first allocation and sets the second bandwidth allocation to the guaranteed second allocation (508). The guaranteed allocations may be equal amounts, e.g., each guaranteed allocation for N throttlers may be 1/N*total bandwidth allocation. In other implementations, the guaranteed allocation may be different from each other, e.g., a virtual machine may have a guaranteed allocation of 40% of the total allocated bandwidth, and the storage system may have a guaranteed allocation of 60% of the total allocated bandwidth.

To illustrate, assume the total bandwidth allocation is 2 GB/s, and assume that the virtual machine demand is 1.10 GB/s, and the storage system demand is 1.5 GB/s. Also assume the guaranteed bandwidth allocation for the virtual machine is 800 MB/s, and the guaranteed bandwidth allocation for the storage system is 1.2 GB/s. In this case, the virtual machine bandwidth allocation would be set to 800 MB/s, and the storage system bandwidth would be set to 1.2 GB/s.

When the sum of all bandwidth demands exceed the total bandwidth allocation, but not all of the bandwidth demands exceed their respective guaranteed allocations, then the distributed bandwidth limiter 220 attempts to allocate bandwidth based on the relative needs of the entities. In these situations, the allocated bandwidth for a managed entity may thus end up being less than the guaranteed bandwidth allocation for that entity.

For example, if the process does not determine that the first bandwidth demand exceeds the guaranteed first allocation and the second bandwidth demand exceeds the guaranteed second allocation, then the process 500 determines whether the second bandwidth demand is less than the guaranteed second allocation (510). If the process 500 does determine that the second bandwidth demand is less than the guaranteed second allocation, then the process 500 sets the second bandwidth allocation to the second bandwidth demand and sets the first bandwidth allocation to a difference of the total bandwidth allocation and second bandwidth allocation (512).

Again to illustrate, assume the total bandwidth allocation is 2 GB/s, and assume that the virtual machine demand (the second bandwidth demand) is 400 MB/s, and the storage system demand (the first bandwidth demand) is 1.8 GB/s. Also assume the guaranteed bandwidth allocation for the virtual machine is 800 MB/s, and the guaranteed bandwidth allocation for the storage system is 1.2 GB/s. In this case, the virtual machine bandwidth allocation would be set to 400 MB/s, and the storage system bandwidth would be set to 1.6 GB/s.

If the process does not determine that the second bandwidth demand is less than the guaranteed second allocation, then the process 500 sets the first bandwidth allocation to the first bandwidth demand and sets the second bandwidth allocation to a difference of the total bandwidth allocation and the first bandwidth allocation (514). Again to illustrate, assume the total bandwidth allocation is 2 GB/s, and assume that the virtual machine demand (the second bandwidth demand) is 1.3 GB/s, and the storage system demand (the first bandwidth demand) is 1.0 GB/s. Also assume the guaranteed bandwidth allocation for the virtual machine is 800 MB/s, and the guaranteed bandwidth allocation for the storage system is 1.2 GB/s. In this case, the virtual machine bandwidth allocation would be set to 1.0 GB/s, and the storage system bandwidth would be set to 1.0 GB/s.

Returning to 504, if the process 500 did not determine the sum of the first and second bandwidth demands exceed the total bandwidth allocation, then the process 500 determines whether both the first and second bandwidth demands are less than their respective guaranteed allocations (516). If the process does determine that both the first and second bandwidth demands are less than their respective guaranteed allocations, then the process 500 sets the first bandwidth allocation to the guaranteed first allocation and the second bandwidth allocation to the guaranteed second allocation (518). More generally, in the situation in which the sum of all bandwidth demands is less than the total allocated bandwidth, and each bandwidth demand for an entity is less than the guaranteed bandwidth allocation for that entity, then the bandwidth allocation for each entity is set to the guaranteed bandwidth allocation for that entity.

To illustrate, assume again the total bandwidth allocation is 2 GB/s, and assume that the virtual machine demand is 200 MB/s, and the storage system demand is 300 MB/s. Also assume the guaranteed bandwidth allocation for the virtual machine is 800 MB/s, and the guaranteed bandwidth allocation for the storage system is 1.2 GB/s. In this case, the virtual machine bandwidth allocation would be set to 800 MB/s, and the storage system bandwidth would be set to 1.2 GB/s.

When the sum of all bandwidth demands is less than the total bandwidth allocation, but some of the bandwidth demands exceed their respective guaranteed allocations, then the distributed bandwidth limiter will again attempt to allocate bandwidth based on the relative needs of the entities. For example, if the process does not determine that both the first and second bandwidth demands are less than their respective guaranteed allocations, then the process 500 determines whether the first bandwidth demand exceeds the guaranteed first bandwidth allocation (520). If the process does determine that the first bandwidth demand exceeds the guaranteed first bandwidth allocation, then the process 500 sets the first bandwidth allocation to first bandwidth demand and second bandwidth allocation to a difference of the total bandwidth allocation and the first bandwidth allocation (522).

To illustrate, assume again the total bandwidth allocation is 2 GB/s, and assume that the virtual machine demand is 400 MB/s, and the storage system demand is 1.4 GB/s. Also assume the guaranteed bandwidth allocation for the virtual machine is 800 MB/s, and the guaranteed bandwidth allocation for the storage system is 1.2 GB/s. In this case, the virtual machine bandwidth allocation would be set to 600 MB/s, and the storage system bandwidth would be set to 1.4 GB/s.

If the process does not determine that the first bandwidth demand exceeds the guaranteed first bandwidth allocation, then the process 500 set the second bandwidth allocation to a second bandwidth demand and the first bandwidth allocation to a difference of the total bandwidth allocation and the second bandwidth allocation (524). To illustrate, assume again the total bandwidth allocation is 2 GB/s, and assume that the virtual machine demand is 900 MB/s, and the storage system demand is 1.0 GB/s. Also assume the guaranteed bandwidth allocation for the virtual machine is 800 MB/s, and the guaranteed bandwidth allocation for the storage system is 1.2 GB/s. In this case, the virtual machine bandwidth allocation would be set to 900 MB/s, and the storage system bandwidth would be set to 1.1 GB/s.

Even with bandwidth allocations based on prior usage values, there may be situations in which the total bandwidth allocation may have some underutilized bandwidth. This may occur, for example, when an allocated bandwidth for an entity was set to its determined demand bandwidth. Thus, the distributed bandwidth limiter 220, in some implementations, provides a bandwidth allocation offset that is based on observed unused bandwidth.

For example, assume that for a previous iteration, a first entity had a bandwidth allocation that was set to its bandwidth demand. If an unused bandwidth is observed for that entity for the prior period, then that unused bandwidth can be allocated to other traffic, e.g., allocated to traffic for one or more other entities, during a current period. The distributed bandwidth limiter may use the following algorithm to accomplish the bandwidth allocation offset:

if(bandwidth_allocation_1[$i$−1]==demand_1[$i$−1])

unused_bandwidth=bandwidth_allocation_1[$i$−1]−usage_value_1[$i$−1]

bandwidth_allocation_2[$i$]=bandwidth_allocation_2[$i$]+unused_bandwidth where:
bandwidth_allocation_1[$i$−1] is a bandwidth allocation for a first entity for a previous iteration;
demand_1[$i$−1] is the bandwidth demand determined for the first entity for the previous iteration;
usage_value_1[$i$−1] is the usage value reported for the previous iteration; and
bandwidth_allocation_2[$i$] is a bandwidth allocation for a second entity for a current iteration that immediately follows the previous iteration.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A distributed bandwidth allocation system for managing bandwidth allocation to two or more entities that are subject to a total bandwidth allocation, the system comprising:
 a distributed bandwidth limiter that:
  receives first usage data describing a first bandwidth usage value for a first entity; and
  receives second usage data describing a second bandwidth usage value for a second entity; and
  based on the first usage data, second usage data, and a total bandwidth allocation, determines a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation;
 a first throttler that:
  receives from the distributed bandwidth limiter the first bandwidth allocation;
  throttles bandwidth available for network traffic for the first entity according to the first bandwidth allocation; and reports to the distributed bandwidth limiter the first usage data; and a second throttler that:
  receives from the distributed bandwidth limiter the second bandwidth allocation;
  throttles bandwidth available for network traffic for the second entity according to the second bandwidth allocation; and
  reports to the distributed bandwidth limiter the second usage data;

wherein the distributed bandwidth limiter iteratively determines the first bandwidth allocation and the second bandwidth allocation by determining, based on prior first bandwidth usage values, a first entity bandwidth demand, and based on prior second bandwidth usage values, a second entity bandwidth demand;

for each iteration the distributed bandwidth limiter provides the first bandwidth allocation to the first throttler and the second bandwidth allocation to the second throttler, including:
  determines a first entity scale factor based on a current first bandwidth usage value and the first entity bandwidth demand, and a second entity scale factor based on a current second bandwidth usage value and the second entity bandwidth demand;
  determines the first bandwidth allocation and the second bandwidth allocation based on the respective first entity scale factor and second entity scale factor;
  determines whether the current first bandwidth usage value meets a first entity demand threshold based on first entity bandwidth demand; and
  determines whether a current second bandwidth usage value meets a second entity demand threshold based on the second entity bandwidth demand;

for each iteration for which the current first bandwidth usage value meets the first entity demand threshold, the distributed bandwidth limiter increments the first entity scale factor, and for each iteration for which the current first bandwidth usage value does not meet the first entity demand threshold, the distributed bandwidth limiter resets the first entity scale factor to an initial first entity scale factor value; and for each iteration for which the current second bandwidth usage value meets the second entity demand threshold, the distributed bandwidth limiter increments the second entity scale factor, and for each iteration for which the current second bandwidth usage value does not meet the second entity demand threshold, the distributed bandwidth limiter resets the second entity scale factor to an initial second entity scale factor value.

2. The system of claim 1, wherein:
the distributed bandwidth limiter determines the first entity bandwidth demand based on a product of the first entity scale factor and at least one of a plurality of prior first bandwidth usage values; and
the distributed bandwidth limiter determines the second entity bandwidth demand based on a product of the second entity scale factor and at least one of a plurality of prior second bandwidth usage values.

3. A distributed bandwidth allocation system for managing bandwidth allocation to two or more entities that are subject to a total bandwidth allocation, the system comprising:
a distributed bandwidth limiter that:
  receives first usage data describing a first bandwidth usage value for a first entity; and
  receives second usage data describing a second bandwidth usage value for a second entity; and
  based on the first usage data, second usage data, and a total bandwidth allocation, determines a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation;
a first throttler that:
  receives from the distributed bandwidth limiter the first bandwidth allocation;
  throttles bandwidth available for network traffic for the first entity according to the first bandwidth allocation; and
  reports to the distributed bandwidth limiter the first usage data; and
a second throttler that:
  receives from the distributed bandwidth limiter the second bandwidth allocation;
  throttles bandwidth available for network traffic for the second entity according to the second bandwidth allocation; and
  reports to the distributed bandwidth limiter the second usage data;
wherein the distributed bandwidth limiter iteratively determines the first bandwidth allocation and the second bandwidth allocation by determining, based on prior first bandwidth usage values, a first entity bandwidth demand, and based on prior second bandwidth usage values, a second entity bandwidth demand and, for each iteration, provides the first bandwidth allocation to the first throttler and the second bandwidth allocation to the second throttler;
wherein for iterations for which the distributed bandwidth limiter determines a sum of the first entity bandwidth demand and second entity bandwidth demand exceeds the total allocation bandwidth:
the distributed bandwidth limiter sets the first bandwidth allocation to a guaranteed first bandwidth allocation and sets the second bandwidth allocation to a guaranteed second bandwidth allocation when both the first entity bandwidth demand exceeds the guaranteed first bandwidth allocation and the second entity bandwidth demand exceeds the guaranteed second bandwidth allocation;
the distributed bandwidth limiter sets the second bandwidth allocation to the second entity bandwidth demand and then sets the first bandwidth allocation to a difference of the total allocation bandwidth and the second bandwidth allocation when the second entity bandwidth demand is less than the guaranteed second bandwidth allocation; and
the distributed bandwidth limiter sets the first bandwidth allocation to the first entity bandwidth demand and then sets the second bandwidth allocation to a difference of the total allocation bandwidth and the first bandwidth allocation when first entity bandwidth demand is less than the guaranteed first bandwidth allocation.

4. A distributed bandwidth allocation system for managing bandwidth allocation to two or more entities that are subject to a total bandwidth allocation, the system comprising:
a distributed bandwidth limiter that:

receives first usage data describing a first bandwidth usage value for a first entity; and receives second usage data describing a second bandwidth usage value for a second entity; and based on the first usage data, second usage data, and a total bandwidth allocation, determines a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation;

a first throttler that:

receives from the distributed bandwidth limiter the first bandwidth allocation;

throttles bandwidth available for network traffic for the first entity according to the first bandwidth allocation; and reports to the distributed bandwidth limiter the first usage data; and a second throttler that:

receives from the distributed bandwidth limiter the second bandwidth allocation;

throttles bandwidth available for network traffic for the second entity according to the second bandwidth allocation; and reports to the distributed bandwidth limiter the second usage data;

wherein the distributed bandwidth limiter iteratively determines the first bandwidth allocation and the second bandwidth allocation by determining, based on prior first bandwidth usage values, a first entity bandwidth demand, and based on prior second bandwidth usage values, a second entity bandwidth demand and, for each iteration, provides the first bandwidth allocation to the first throttler and the second bandwidth allocation to the second throttler;

wherein for iterations for which the distributed bandwidth limiter determines a sum of the first entity bandwidth demand and second entity bandwidth demand is less than the total allocation bandwidth:

the distributed bandwidth limiter sets the first bandwidth allocation to a guaranteed first bandwidth allocation and sets the second bandwidth allocation to a guaranteed second bandwidth allocation when both the first entity bandwidth demand is less than the guaranteed first bandwidth allocation and the second entity bandwidth demand is less than the guaranteed second bandwidth allocation;

the distributed bandwidth limiter sets the first bandwidth allocation to the first entity bandwidth demand and then sets the second bandwidth allocation to a difference of the total allocation bandwidth and the first bandwidth allocation when the first entity bandwidth demand is greater than the guaranteed first bandwidth allocation; and the distributed bandwidth limiter sets the second bandwidth allocation to the second entity bandwidth demand and then sets the first bandwidth allocation to a difference of the total allocation bandwidth and the second bandwidth allocation when the second entity bandwidth demand is greater than the guaranteed second bandwidth allocation.

5. A distributed bandwidth allocation system for managing bandwidth allocation to two or more entities that are subject to a total bandwidth allocation, the system comprising:

a distributed bandwidth limiter that:

receives first usage data describing a first bandwidth usage value for a first entity; and receives second usage data describing a second bandwidth usage value for a second entity; and based on the first usage data, second usage data, and a total bandwidth allocation, determines a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation;

a first throttler that:

receives from the distributed bandwidth limiter the first bandwidth allocation;

throttles bandwidth available for network traffic for the first entity according to the first bandwidth allocation; and reports to the distributed bandwidth limiter the first usage data; and a second throttler that:

receives from the distributed bandwidth limiter the second bandwidth allocation;

throttles bandwidth available for network traffic for the second entity according to the second bandwidth allocation; and reports to the distributed bandwidth limiter the second usage data;

wherein:

the first entity is a storage system and the second entity is a virtual machine for which the storage system provides data storage;

the first usage data is storage system usage data and the first bandwidth usage value is a storage bandwidth usage value for network traffic for the storage system; and the second usage data is virtual machine usage data for a virtual machine and the second bandwidth usage value is for network traffic for the virtual machine;

the first bandwidth allocation is a storage bandwidth allocation specifying bandwidth available for network traffic for the storage system;

the second bandwidth allocation is a virtual machine bandwidth allocation that specifies bandwidth available for network traffic for the virtual machine;

the first throttler is a storage system throttler that throttles bandwidth available for network traffic for the storage system according to the storage system bandwidth allocation; and the second throttler is a virtual machine throttler that throttles bandwidth available for network traffic for the virtual machine according to the virtual machine bandwidth allocation.

6. The system of claim 5, wherein:

the distributed bandwidth limiter and the storage system throttler are instantiated in a hypervisor that manages the virtual machine and network traffic for the storage system storage for the virtual machine; and the virtual machine throttler is implemented in a virtual switch through which network traffic for the virtual machine is routed to a network external to a host machine on which the virtual machine is instantiated.

7. A computer implemented method performed by a data processing apparatus, the method comprising:
receiving, by the data processing apparatus and from a first throttler for a first entity, first usage data describing a first bandwidth usage value for the first entity; and
receiving, by the data processing apparatus and from a second throttler for a second entity, second usage data describing a second bandwidth usage value for the second entity;
based the first usage data, second usage data, and a total bandwidth allocation, determining, by the data processing apparatus, a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation;
providing, by the data processing apparatus, the first bandwidth allocation to the first throttler, wherein the first throttler throttles bandwidth available for network traffic for the first entity according to the first bandwidth allocation; and
providing, by the data processing apparatus, the second bandwidth allocation to the second throttler, wherein the second throttler throttles bandwidth available for network traffic for the second entity according to the second bandwidth allocation;
wherein:
determining the first bandwidth allocation and the second bandwidth allocation comprise iteratively determining, based on prior first bandwidth usage values, a first entity bandwidth demand, and based on prior second bandwidth usage values, a second entity bandwidth demand, and;
for each iteration the method provides the first bandwidth allocation to the first throttler and the second bandwidth allocation to the second throttler, and each for each iteration the method comprises:
determining whether the current first bandwidth usage value meets a first entity demand threshold based on first entity bandwidth demand; and
determining whether a current second bandwidth usage value meets a second entity demand threshold based on the second entity bandwidth demand;
for each iteration for which the current first bandwidth usage value meets the first entity demand threshold, incrementing the first entity scale factor, and for each iteration for which the current first bandwidth usage value does not meet the first entity demand threshold, the resetting the first entity scale factor to an initial first entity scale factor value; and
for each iteration for which the current second bandwidth usage value meets the second entity demand threshold, the incrementing the second entity scale factor, and for each iteration for which the current second bandwidth usage value does not meet the second entity demand threshold, the resetting the second entity scale factor to an initial second entity scale factor value.

8. The computer-implemented method of claim 7, further comprising:
determining the first entity bandwidth demand based on a product of the first entity scale factor and at least one of a plurality of prior first bandwidth usage values; and
determining the second entity bandwidth demand based on a product of the second entity scale factor and at least one of a plurality of prior second bandwidth usage values.

9. A computer implemented method performed by a data processing apparatus, the method comprising:
receiving, by the data processing apparatus and from a first throttler for a first entity, first usage data describing a first bandwidth usage value for the first entity; and
receiving, by the data processing apparatus and from a second throttler for a second entity, second usage data describing a second bandwidth usage value for the second entity;
based the first usage data, second usage data, and a total bandwidth allocation, determining, by the data processing apparatus, a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation;
providing, by the data processing apparatus, the first bandwidth allocation to the first throttler, wherein the first throttler throttles bandwidth available for network traffic for the first entity according to the first bandwidth allocation; and
providing, by the data processing apparatus, the second bandwidth allocation to the second throttler, wherein the second throttler throttles bandwidth available for network traffic for the second entity according to the second bandwidth allocation;
wherein:
determining the first bandwidth allocation and the second bandwidth allocation comprise iteratively determining, based on prior first bandwidth usage values, a first entity bandwidth demand, and based on prior second bandwidth usage values, a second entity bandwidth demand, and, for each iteration, providing the first bandwidth allocation to the first throttler and the second bandwidth allocation to the second throttler;
wherein for iterations for which a sum of the first entity bandwidth demand and second entity bandwidth demand exceeds the total allocation bandwidth:
setting the first bandwidth allocation to a guaranteed first bandwidth allocation and sets the second bandwidth allocation to a guaranteed second bandwidth allocation when both the first entity bandwidth demand exceeds the guaranteed first bandwidth allocation and the second entity bandwidth demand exceeds the guaranteed second bandwidth allocation;
setting the second bandwidth allocation to the second entity bandwidth demand and then sets the first bandwidth allocation to a difference of the total allocation bandwidth and the second bandwidth allocation when the second entity bandwidth demand is less than the guaranteed second bandwidth allocation; and
setting the first bandwidth allocation to the first entity bandwidth demand and then sets the second bandwidth allocation to a difference of the total allocation bandwidth and the first bandwidth allocation when first entity bandwidth demand is less than the guaranteed first bandwidth allocation.

10. A computer implemented method performed by a data processing apparatus, the method comprising:

receiving, by the data processing apparatus and from a first throttler for a first entity, first usage data describing a first bandwidth usage value for the first entity; and receiving, by the data processing apparatus and from a second throttler for a second entity, second usage data describing a second bandwidth usage value for the second entity;

based the first usage data, second usage data, and a total bandwidth allocation, determining, by the data processing apparatus, a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation;

providing, by the data processing apparatus, the first bandwidth allocation to the first throttler, wherein the first throttler throttles bandwidth available for network traffic for the first entity according to the first bandwidth allocation; and providing, by the data processing apparatus, the second bandwidth allocation to the second throttler, wherein the second throttler throttles bandwidth available for network traffic for the second entity according to the second bandwidth allocation;

wherein:
determining the first bandwidth allocation and the second bandwidth allocation comprise iteratively determining, based on prior first bandwidth usage values, a first entity bandwidth demand, and based on prior second bandwidth usage values, a second entity bandwidth demand, and, for each iteration, providing the first bandwidth allocation to the first throttler and the second bandwidth allocation to the second throttler;

wherein for iterations for which a sum of the first entity bandwidth demand and second entity bandwidth demand is less than the total allocation bandwidth:

setting the first bandwidth allocation to a guaranteed first bandwidth allocation and sets the second bandwidth allocation to a guaranteed second bandwidth allocation when both the first entity bandwidth demand is less than the guaranteed first bandwidth allocation and the second entity bandwidth demand is less than the guaranteed second bandwidth allocation;

setting the first bandwidth allocation to the first entity bandwidth demand and then sets the second bandwidth allocation to a difference of the total allocation bandwidth and the first bandwidth allocation when the first entity bandwidth demand is greater than the guaranteed first bandwidth allocation; and setting the second bandwidth allocation to the second entity bandwidth demand and then sets the first bandwidth allocation to a difference of the total allocation bandwidth and the second bandwidth allocation when the second entity bandwidth demand is greater than the guaranteed second bandwidth allocation.

11. A computer implemented method performed by a data processing apparatus, the method comprising:

receiving, by the data processing apparatus and from a first throttler for a first entity, first usage data describing a first bandwidth usage value for the first entity; and receiving, by the data processing apparatus and from a second throttler for a second entity, second usage data describing a second bandwidth usage value for the second entity;

based the first usage data, second usage data, and a total bandwidth allocation, determining, by the data processing apparatus, a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation;

providing, by the data processing apparatus, the first bandwidth allocation to the first throttler, wherein the first throttler throttles bandwidth available for network traffic for the first entity according to the first bandwidth allocation; and providing, by the data processing apparatus, the second bandwidth allocation to the second throttler, wherein the second throttler throttles bandwidth available for network traffic for the second entity according to the second bandwidth allocation;

wherein:
the first entity is a storage system and the second entity is a virtual machine for which the storage system provides data storage;

the first usage data is storage system usage data and the first bandwidth usage value is a storage bandwidth usage value for network traffic for the storage system; and the second usage data is virtual machine usage data for a virtual machine and the second bandwidth usage value is for network traffic for the virtual machine;

the first bandwidth allocation is a storage bandwidth allocation specifying bandwidth available for network traffic for the storage system;

the second bandwidth allocation is a virtual machine bandwidth allocation that specifies bandwidth available for network traffic for the virtual machine;

the first throttler is a storage system throttler that throttles bandwidth available for network traffic for the storage system according to the storage system bandwidth allocation; and the second throttler is a virtual machine throttler that throttles bandwidth available for network traffic for the virtual machine according to the virtual machine bandwidth allocation.

12. A non-transitory computer storage device storing instructions that upon execution by a data processing apparatus cause the data processing apparatus to perform operations comprising:

receiving from a first throttler for a first entity, first usage data describing a first bandwidth usage value for the first entity; and receiving from a second throttler for a second entity, second usage data describing a second bandwidth usage value for the second entity;

based the first usage data, second usage data, and a total bandwidth allocation, determining a first bandwidth allocation specifying bandwidth available for network traffic for the first entity and a second bandwidth allocation that specifies bandwidth available for network traffic for the second entity, wherein a sum of the first bandwidth allocation and the second bandwidth allocation does not exceed the total bandwidth allocation;

providing the first bandwidth allocation to the first throttler, wherein the first throttler throttles bandwidth available for network traffic for the first entity according to the first bandwidth allocation; and providing the second bandwidth allocation to the second throttler, wherein the second throttler throttles bandwidth available for network traffic for the second entity according to the second bandwidth; allocation;

wherein:

the first entity is a storage system and the second entity is a virtual machine for which the storage system provides data storage;

the first usage data is storage system usage data and the first bandwidth usage value is a storage bandwidth usage value for network traffic for the storage system; and the second usage data is virtual machine usage data for a virtual machine and the second bandwidth usage value is for network traffic for the virtual machine;

the first bandwidth allocation is a storage bandwidth allocation specifying bandwidth available for network traffic for the storage system;

the second bandwidth allocation is a virtual machine bandwidth allocation that specifies bandwidth available for network traffic for the virtual machine;

the first throttler is a storage system throttler that throttles bandwidth available for network traffic for the storage system according to the storage system bandwidth allocation; and the second throttler is a virtual machine throttler that throttles bandwidth available for network traffic for the virtual machine according to the virtual machine bandwidth allocation.

\* \* \* \* \*